(12) United States Patent
Nicholson et al.

(10) Patent No.: US 9,392,059 B2
(45) Date of Patent: Jul. 12, 2016

(54) COMMUNICATION PROTOCOL

(71) Applicants: Joseph Leslie Nicholson, Abingdon (GB); Gareth Robert Barr, New York, NY (US)

(72) Inventors: Joseph Leslie Nicholson, Abingdon (GB); Gareth Robert Barr, New York, NY (US)

( * ) Notice: Subject to any disclaimer, the term of this patent is extended or adjusted under 35 U.S.C. 154(b) by 187 days.

(21) Appl. No.: 13/839,137

(22) Filed: Mar. 15, 2013

(65) Prior Publication Data

US 2014/0280671 A1    Sep. 18, 2014

(51) Int. Cl.
*H04L 29/08* (2006.01)
*H04W 4/00* (2009.01)

(52) U.S. Cl.
CPC ........... *H04L 67/1097* (2013.01); *H04W 4/005* (2013.01)

(58) Field of Classification Search
USPC .......................... 709/213, 219, 226, 203, 212
See application file for complete search history.

(56) References Cited

U.S. PATENT DOCUMENTS

| | | | |
|---|---|---|---|
| 6,684,260 B1 * | 1/2004 | Foster et al. ................... | 719/327 |
| 7,197,703 B1 * | 3/2007 | Rule ................. | G06F 17/30011 707/E17.008 |
| 2007/0028292 A1 * | 2/2007 | Kabzinski ............... | G06F 21/31 726/2 |
| 2008/0104348 A1 * | 5/2008 | Kabzinski ............... | G06F 21/78 711/164 |
| 2010/0268768 A1 * | 10/2010 | Kurtenbach ........ | H04L 67/1097 709/203 |
| 2011/0249636 A1 * | 10/2011 | Cherian et al. ................. | 370/329 |
| 2013/0204734 A1 * | 8/2013 | Norris et al. .................. | 705/26.5 |
| 2014/0164942 A1 * | 6/2014 | Lemarquand et al. ........ | 715/744 |
| 2014/0244623 A1 * | 8/2014 | King ....................... | H04L 67/42 707/722 |

* cited by examiner

*Primary Examiner* — Jude Jean Gilles
(74) *Attorney, Agent, or Firm* — Tumey L.L.P.

(57) ABSTRACT

The invention relates to a specification for an internet enabled device or application, the specification comprises one or more functional interfaces, defining attributes or operating characteristics of said device or application, and said specification defines the overall capabilities of said device or application. The invention also relates to a functional interface which defines attributes or operating characteristics of said device or application, as well as a central storage repository for use in a network wherein said central storage repository stores a specification for each device and/or application and/or the at least one server; the specification is comprised of one or more functional interfaces, and said central repository is easily accessible and a method of enabling communication between devices and/or applications and/or a server within a network the network comprising at least one client device and/or client application and at least one server.

24 Claims, 4 Drawing Sheets

COMMUNICATION PROTOCOL

CROSS-REFERENCE TO RELATED APPLICATIONS

Not Applicable

BACKGROUND

The present invention relates generally to a method for allowing devices and applications on devices that may be controlled using different operating systems or communication protocols to easily and simply communicate with each other, even though the operating systems or communication protocols may not be readily compatible.

Machine to Machine (M2M) communication is a growing field, and various different methods to allow network enabled devices to communicate over a network have been described. At the present moment, there is no one straightforward standard approach that easily allows the use of one type of communication system between all devices, irrespective of the type of device, the manufacturer of the device, or the operating system used by the device. In essence, there is a large compatibility problem, preventing communication between devices of different makes.

In some cases, individual device manufacturers will have designed and implemented a solution whereby products produced by that manufacturer can easily communicate between products, but communication between products from a different manufacturer is less straightforward. Furthermore, there may even be a communication problem between earlier and later versions of the same device from the same manufacturer.

For a typical consumer, obtaining devices that can easily communicate is limited, and is generally expensive. Although some devices and applications can communicate between themselves, if a particular communication system then becomes unavailable (for example if the operating software is upgraded, or becomes obsolete, or if businesses cease to trade in a specific area) this may mean that after a certain time, communication between devices is no longer supported and the devices can no longer communicate.

Furthermore, in cases where inter device communication requires a sophisticated technology, it may be that all elements of the technology are needed to allow inter device communication. If one of the elements fails, becomes redundant or is superseded, then the entire technology to allow the communication may need to be reconfigured.

Another drawback with current M2M systems is that the type of information that can be communicated between a device and, for example, a server, is typically limited to capabilities supported by the protocol that is installed on the device at the time of purchase, or provided during regular upgrades. In these situations, the ability to use the device most effectively is therefore controlled by the service provider or manufacturer rather than the user of the device.

According to the invention there is provided a specification for an internet enabled device or application, wherein the specification comprises one or more functional interfaces, each interface defining one or more attributes or operating characteristics of said device or application, and said specification defines the overall capabilities of said device or application.

SUMMARY

The present invention relates generally to a method for allowing devices and applications on devices that may be controlled using different operating systems or communication protocols to easily and simply communicate with each other, even though the operating systems or communication protocols may not be readily compatible.

In a preferred embodiment of the invention, said specification is provided to a central storage repository which is publicly accessible within a defined network.

Preferably, said specification is provided with a unique identifier code to identify the type of device/application that the specification is for.

According to the invention there is also provided a functional interface for an internet enabled device or application wherein said functional interface defines an attribute or operating characteristic of said device or application.

Preferably, said functional interface is provided to a central storage repository which is publicly accessible within a defined network.

According to the invention there is also provided a central storage repository for use in a network comprising at least one device and/or application and at least one server, wherein said central storage repository stores a specification for each device and/or application and/or the at least one server; wherein the specification is comprised of one or more functional interfaces, each interface defining one or more attributes or operating characteristics of the device or application or server, and said central repository is accessible to subscribers of the network.

In a preferred embodiment of the invention when new devices and/or applications and/or servers join said network and have compatible defined specifications, the specifications for the new devices and/or applications and/or servers are uploaded onto said repository to be easily accessible to other members of the network.

In a further preferred embodiment of the invention when new devices and/or applications and/or servers join said network, and have compatible defined specification, said specification has been pre-provided to said storage repository by the manufacturer of said device/application or server.

In an alternative preferred embodiment of the invention when new devices and/or applications and/or servers join said network and do not have a compatible defined specification, a specification can be created from specifications within said central repository according to the functionality of the new devices and/or applications and/or servers.

In an embodiment of the invention each specification is provided with a unique identification code.

Preferably, when said device and/or application is upgraded by the manufacturer the manufacturer provides an upgraded specification to said storage repository.

In a further preferred embodiment said at least one specification contains a cross-reference to one or more of said specifications.

Preferably, said at least one upgraded specification contains a cross-reference to said specification that it is upgrading.

Preferably, said specification contains a cross-reference to other functional interfaces.

Further preferably, said repository is arranged into a library so that a specification for a particular device and/or application, is stored in a particular area of said library.

In a preferred embodiment of the invention the repository is arranged so that functional interfaces of the same type are stored in the same area of said library.

Preferably, the repository is located in the cloud. Alternatively, the repository is located in a server in a local network.

In both cases, said repository will be either publicly accessible via the Internet, or is only accessible to subscribers of the network.

In an embodiment of the invention, said repository recognises the specifications and can map the specification to the correct device/application or server.

According to the invention, there is also provided a method of enabling communication between devices and/or applications and/or a server within a network, the members of the network comprising at least one device and/or application, at least one server and a central storage repository and/or a local storage repository; the method comprising the steps of: providing a specification for each device and/or application and/or the at least one server to said central storage repository or said local storage repository; wherein the specification is comprised of one or more functional interfaces, each interface defining one or more attributes or operating characteristics of the device or application or server, providing one or more functional interfaces, or one or more specifications for one or more devices and/or applications from either said central repository or said local repository to one or more other devices and/or/applications within the network to allow either: communication between said first device/application and said one or more other device/application server, or to allow said other devices and/or applications to operate in accordance with said functional interfaces or one or more specifications as provided from said central storage repository or said local repository.

In an embodiment of the invention, when new devices and/or applications and/or servers join said network and have defined specifications, the specifications for the new devices and/or applications and/or servers are provided to said central repository and/or said local repository to be easily accessible to other members of the network.

Further preferably, when new devices and/or applications and/or servers join said network, and have compatible defined specification, said specification has been pre-provided to said central or local storage repository by the manufacturer.

In an alternative embodiment of the invention, when new devices and/or applications and/or servers join said network and do not have a compatible defined specification, a compatible specification can be created from specifications within said central repository according to the desired functionality of the new devices and/or applications and/or servers.

Preferably, when a said device and/or application is upgraded by the manufacturer the manufacturer provides an upgraded specification to said storage repository. Preferably, said upgraded specification will contain a reference to the specification it is an upgrade of.

In a preferred embodiment of the invention, the one or more specifications are all provided to said central storage repository in the same language. Preferably, said language is XML.

In an embodiment of the invention, at least one of said one or more specifications is provided with a unique identifier code.

Preferably, said central storage repository is provided with a library so that specifications with a particular functional interface are stored in a specific region of said library.

Preferably, the device is any physical device that is internet enabled. Alternatively, said application performs as a virtual device.

In an embodiment of the invention said virtual device is provided with a specification from said repository comprising at least one functional interface to allow it to operate in the same way as a physical device.

Preferably, said specification contains a cross reference to one or more of the other specifications.

A preferred embodiment of the invention further comprises the step of: transmitting at least one message between members of the network. Preferably a first message is transmitted from a device or application to a server.

A further preferred embodiment of the invention further comprises the steps of reviewing said first received message at said server, and either transmitting said received message unchanged from said server to an alternative device or application from that where the message originated, or: generating a revised message in response to said received message and transmitting the revised message to a device or application within the network.

Preferably, said revised message is transmitted to a different device or application to the device or application where the original received message originated.

Further preferably, said at least one message provides status information about the device/application it originated from or is a request for action or for information from the server or from another device or application.

In an embodiment of the invention, said message is a request for action; and when said message is received from said server at said device or application, said device or application implements the action requested in the message.

In a further embodiment of the invention said devices and/or application can receive and/or transmit more than one message, to execute more than one different action.

Preferably, said messages are transmitted over an XMPP transport layer protocol, and said messages are preferably written as XML messages An embodiment of the invention further comprises the step of allowing communication between devices or applications and the server, but forbidding direct communication between devices and/or applications thereby ensuring the security of the network.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The Current technology in the field of M2M communication provides methods for describing applications and device interfaces in a standard way to allow for remote method invocation. Typically, however, it is normal for a device or application to generally expose a single monolithic interface or API that is specific to that particular type of device or application, and that fully describes that device's exposed methods that can be remotely invoked.

Example 1 below shows a typical (prior art) descriptor for a standard television. The descriptor contains instructions for volume control (including a mute function), changing channels and changing the power state (on/off/sleep).

| Sample Legacy TV Descriptor |
| --- |
| Volume_up |
| Volume_down |
| Set_volume |
| Mute |
| Unmute |
| ToggleMute |
| Change_channel(new_channel) |
| Channel_up |
| Channel_down |
| Set_power(new_power_state) |
| Sleep_mode |

Example 1

Example 2 is a similar (prior art) descriptor for a standard Hi-Fi assembly. Again, this example has instructions for volume control (including mute) and power state (on/off/sleep).

| Sample Legacy HiFi Descriptor |
| --- |
| Increase_volume |
| Reduce_volume |
| ToggleMuteButton |
| Power_on |
| Power_off |
| Sleep_mode |

Example 2

A disadvantage with using this type of descriptor is that there is no standardization of methods, and no context as to what they mean. As illustrated above, the descriptors expose similar functionality—e.g. a way to change the volume level, and a way to control the power, but because they are all represented in different ways (even if using the same remote method invocation approach, e.g. SOAP (Simple Object Access Protocol), they are not readily understandable.

In contrast, in the subject invention, each member of the network is provided with a defined specification describing the functional capabilities of that member.

Figure 1:
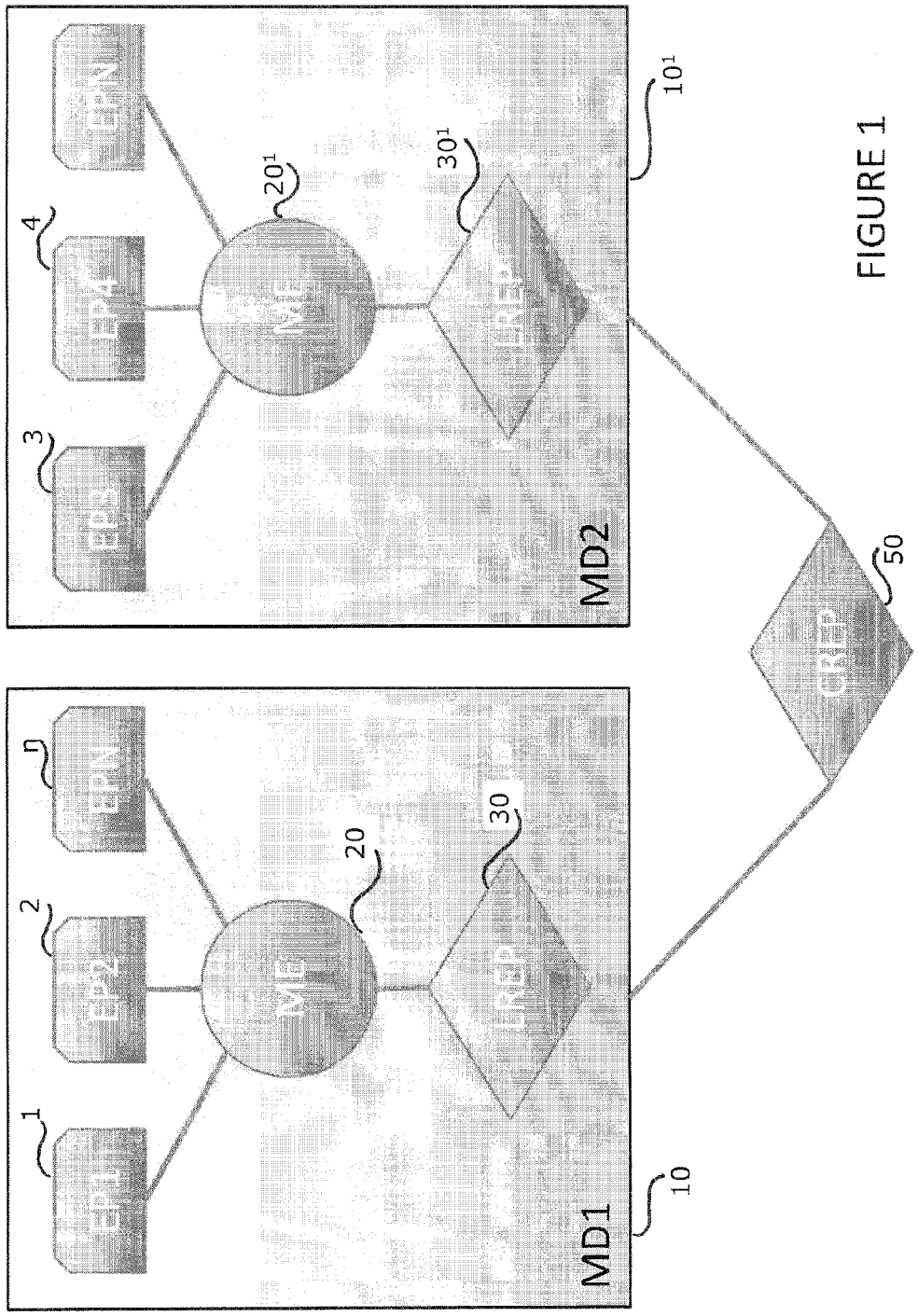
FIG. 1 shows two management domains as used in an embodiment of the invention.

FIG. 1 shows a Management domain MD1 10, containing a network of endpoints EP1-EPN 1, 2, . . . n communicating with each other through a message exchanger ME 20, and with a local schema repository LREP 30 containing descriptions of all of the endpoints currently within the management domain MD1 10. Typically, message exchanger 20 and LREP will be located on a single server (not shown), but they may be located on different platforms instead.

MD2 10' is a separate (but may be affiliated) management domain. This management domain may be for products from a different company, or alternatively, may be for a different set of products that are managed separately to the products within MD1 10. This managed domain is also provided with a message exchanger 20' and an LREP 30', these may also be located on the same server, or alternatively, on different platforms.

As illustrated, MD1 10 & MD2 10' both have a connection back to a Central storage Repository CREP 50. This central repository 50 contains definitions for all functional interfaces and all specifications. All specifications within CREP 50 are provided with a unique identifier code to identify the type or class of device and/or application the specification is for.

The central repository 50 allows the Management Domain 10, 10' to request new or updated specifications and or functional interfaces from the central repository 50. In an embodiment of the invention, CREP 50 may be located within the cloud, or alternatively on a server within a network. The CREP 50 is arranged into a library so that a specification for a particular type or class of device and/or application is located within a particular region of the library. Alternatively, or in addition, the CREP 50 may be arranged so that functional interfaces of the same type are stored in the same area of the library.

In an embodiment of the invention, the endpoints EP1, EP2, . . . EPn 1, 2, . . . n may be any internet enabled device, application, logic or other article or virtual application. These may include but are not limited to: physical devices or applications running on PC's, servers, mobile phones, tablets etc. As will be subsequently described, the invention allows the endpoints EP1, EP2, . . . EPN (1, 2, . . . n) to communicate with each other in such a way that they understand the capabilities of other endpoints EP1, EP2, . . . EPN (1, 2, . . . n) and can therefore interact with each other based on this knowledge. In the invention, applications that can operate as virtual devices are considered to be the same hierarchical level as physical devices. Within MD1, all communication between endpoints must pass via the message exchanger 20. There is no direct control communication between the endpoints EP1, . . . EPn with MD1. This also applies to MD2. This ensures that the security of each managed domain is maintained as the message exchanger 20 is entirely responsible for all communications. Details of how the communications occur within MD1 and MD2 will be described in more detail later.

As mentioned above, there is no direct control communication between endpoints within the management domain. However, there is direct communication between endpoints for transmission/reception of information or data (as distinct from control messages). For example, say audio or video data has to pass from EP1 to EP2 within MD1 10. The control messages related to the data will pass via the message exchanger 20 as described above. However, it would be unnecessarily complex to have to send the data via the message exchanger 20. In this case, the data will be transmitted directly between the two endpoints.

Each of the endpoints EP1, EP2, . . . EPN (1.2, . . . n) will have an associated formalised and standardised specification. As mentioned previously, the specifications are identified by a unique identifier for each type or class of device. This is the case for all endpoints EP1, EP2, . . . EPN (1, 2, . . . n) irrespective of whether they are physical endpoints (radio, telephones, light switches, sensors, actuators etc. . . . ) or virtual endpoints such as software applications (that may be run on a local PC, a mobile telecommunication device, a portable tablet device, cloud applications running on servers over the Internet, applications running on servers within an enterprise). The specification will be described in more detail below.

This invention does not differentiate between physical devices and applications or virtual devices in any way. By contrast, most, M2M infrastructures do typically differentiate between physical devices and server applications or virtual devices. In a typical M2M arrangement for example, it would not be possible to interrogate a server application and a physical real world device in an identical manner using an identical formalised communication standard.

The specification for each endpoint is specific for each variant or type of endpoint, so, for example, different models of the same device from the same manufacturer will have a different specification (but the same models (with the same version) will have the same specifications). E.g. different mobile handsets from the same manufacturer, or different televisions from the same manufacturer.

The specification for each endpoint is made up of one or more functional interfaces. The functional interfaces represent all the operations and attributes associated with a particular area of functionality, for example the functional interface for volume capability may allow the user to set the volume, get the current volume, decrease the volume, increase the volume, mute the volume, et cetera. Similarly, the functional interface for light control may allow the user to turn the light on, turn the light off; set the light intensity to a particular %, obtain the current light intensity etc. At the most basic level, a functional interface may simply be power on/power off.

If the endpoint is an internet enabled radio for example, the specification for this endpoint may contain functional interfaces concerned with volume, power, user buttons, LCD display, radio channel selection and streaming etc. Alternatively, if the endpoint is a central heating thermostatic controller, the specification will have functional interface for a temperature sensor for example.

In this invention, by grouping together related functionality into discrete shared functional interfaces, and associating them with device and/or application types, it becomes possible to assign a meaning to e.g. Volume_up within the context of Volume_Control_Interface, and even to be able to control the volume of devices and/or applications that are otherwise not understood, simply by the endpoints implementing that specific functional interface.

As shown in the following examples, the power state and volume control of both a TV and the Hi-fi can be controlled in a standardized way, even though they are different types of device, and may even originate from different manufacturers.

Example 3 shows a series of functional interfaces along with two alternative specifications for control of a standard television.

the functional interface for Channel control interface has attributes for change channel, channel up and channel down.

The central column of example 3 is a truncated version of the entry in the left hand column which merely shows the title of each functional interface. This is a specification for device X. Again, this is merely illustrative. The specification may continue further functional interfaces, and/or the functional interfaces may contain additional attributes.

The right hand column of the example shows a more a specification for control of a different television, which has additional volume control capabilities included. This entry is for device Y, which is different from device X. In this case, it has additional volume capabilities, but may also have other additional functional interfaces, (not shown in this example), concerned with picture brightness for example. These additional volume control interfaces (labelled volume control capability [1], [2], [3]) provided additional control over the volume, thus allowing for more sophisticated operation of the television. For example, if the television has a multi-zone amplifier, then this will require multiple functional interfaces to be effectively operated. Or it may be used to control the output from different speakers within the television for example.

The functional interfaces and specifications as illustrated are suitable for use by televisions produced by different manufacturers, or televisions for the same manufacture with different technical features or methods of operation.

Example 4 shows a series of functional interfaces that form a specification for control of a standard hi-fi.

| HiFi Specification |
| --- |
| Volume_Control_Interface |
| Volume_up |
| Volume_down |

| TV Specification | TV Specification | Advanced TV Specification |
| --- | --- | --- |
| Volume_Control_Interface | (for Device Type X) | (for Device Type Y) |
| Volume_up | Volume_Control_Interface | Volume_Control_Interface[0] |
| Volume_down | Power_Control_Interface | Volume_Control_Interface[1] |
| Set_volume | Channel_Control_Interface | Volume_Control_Interface[2] |
| Mute | | Volume_Control_Interface[3] |
| Unmute | | Power_Control_Interface |
| ToggleMute | | Channel_Control_Interface |
| Power_Control_Interface | | |
| Set_power(new_power_state) | | |
| Power_on | | |
| Power_off | | |
| Sleep_mode | | |
| Channel_Control_Interface | | |
| Change_channel(new_channel) | | |
| Channel_up | | |
| Channel_down | | |

Example 3

As illustrated, the left-hand side of the example shows each functional interface along with a list of attributes for each interface. That is, functional interfaces for volume control, power control and channel control. Each functional interface contains various attributes. The functional interfaces may also contain additional attributes that are not shown in this example. As illustrated, the functional interface labelled Volume_Control_Interface has attributes for: Volume up, Volume down, Set volume, Mute, Unmute and Toggle mute. The functional interface for Power Control Interface has attributes for set power. Power on, power off and sleep mode. Finally, -continued

| HiFi Specification |
| --- |
| Set_volume |
| Mute |
| Unmute |
| ToggleMute |
| Power_Control_Interface |
| Set_power(new_power_state) |
| Power_on |
| Power_off |
| Sleep_mode |

Example 4

In this simple example, the HiFi is provided with functional interfaces to control the volume and control the power. These different functional interfaces form the specification for the Hi-Fi. Again, further functional interfaces may be added, for skipping tracks on a CD or music download for example, or to increase/decrease the brightness of the output display.

Furthermore, it is apparent for these two examples, that the volume control interface and the power control interfaces are the same for the Hi-Fi and the TV. In effect, the interfaces are entirely functional with no detail at all about the devices they may be used for. Clearly, any device or application which requires volume control or power control will use these same interfaces.

As a further example, a Pan/Tilt/Zoom camera might implement a VideoViewer interface and a 3DControl interface, therefore indicating that it will respond to requests to move left, move right, move up, move down, getimage etc. Of course, the camera may also have other interfaces for other operations that the camera may also perform Returning back to FIG. 1, both MD1 and MD2 are connected to a central storage repository CREP 50. This is a centralised storage area for containing all of the specifications and functional interfaces for endpoints within MD1 or MD2. The central repository 50 is freely accessible over the Internet. However, in an embodiment of the invention, it may be that a subscription is required to allow the users of the network to access the central storage repository 50. Manufacturers will be able to deposit specifications and functional interfaces in the central repository 50 as they are produced for newly released devices and/or applications. Furthermore, as devices are upgraded, for example version 1.1 of a mobile telephone handset is replaced with version 1.2 of the handset then an updated specification for version 1.2 can be provided by the manufacturer directly to the repository. It may be that the upgraded specification contains a direct reference back to the original specification, or it may be that the upgraded specification is completely independent of the preceding specification. In some cases, specification may contain references to other specifications or to other functional interfaces.

There may be a situation where a new endpoint EPZ is produced by a manufacturer (a new television, or radio, or mobile phone handset for example). Typically, before the endpoint is released to the general public (or even before the endpoint enters production), the manufacturer will define the specification for the end point with details of the manufacturer, the model and version information. The manufacturer will then map existing functional interfaces, or provide new functional interfaces to the specification. At this stage, the manufacturer can then produce the product with the appropriate specification.

The manufacturer will publish the specification and make this available to the CREP 50 before the product is placed on general release. The manufacturer will then also make the endpoint available to the public, either via sales or other means. Alternatively, the specification may be provided at the same time the product goes on sale or sometime after the product goes on sale.

A user can now purchase endpoint EPZ and may then wish to enroll the endpoint EPZ in MD1 of FIG. 1. The LREP 30 for MD1 10 may not have the specification for the specific type of endpoint EPZ. In this case, MD1 10, will request CREP 50 to provide the appropriate specification. CREP 50 will respond and provide the specification to be stored in LREP 30. Once LREP 30 has the specification for EPZ, other endpoints EP! . . . EPn 1, . . . n within MD1 10 will be able to request information about EPZ from LREP 30 via the message exchanger 20. Of course, if the specification has previously been provided to LREP 30 from the CREP 50 then there is no need for the LREP 30 to put in the request.

Each endpoint, whether a physical device and/or a virtual application, will be provided with a unique identifier code from the manufacturer, detailing the manufacturer/model/version/software. This unique identifier will allow the LREP 30 and CREP 50 to correctly map the specification to the endpoint type. In this way, when a new mobile phone handset is released onto the market, each handset of the same type will have the same identifier. When an upgraded handset is later released, each upgraded handset will have the same identifier, that is different from the identifier from the earlier handset. This is the case for all different types and classes of device.

Figure 2:
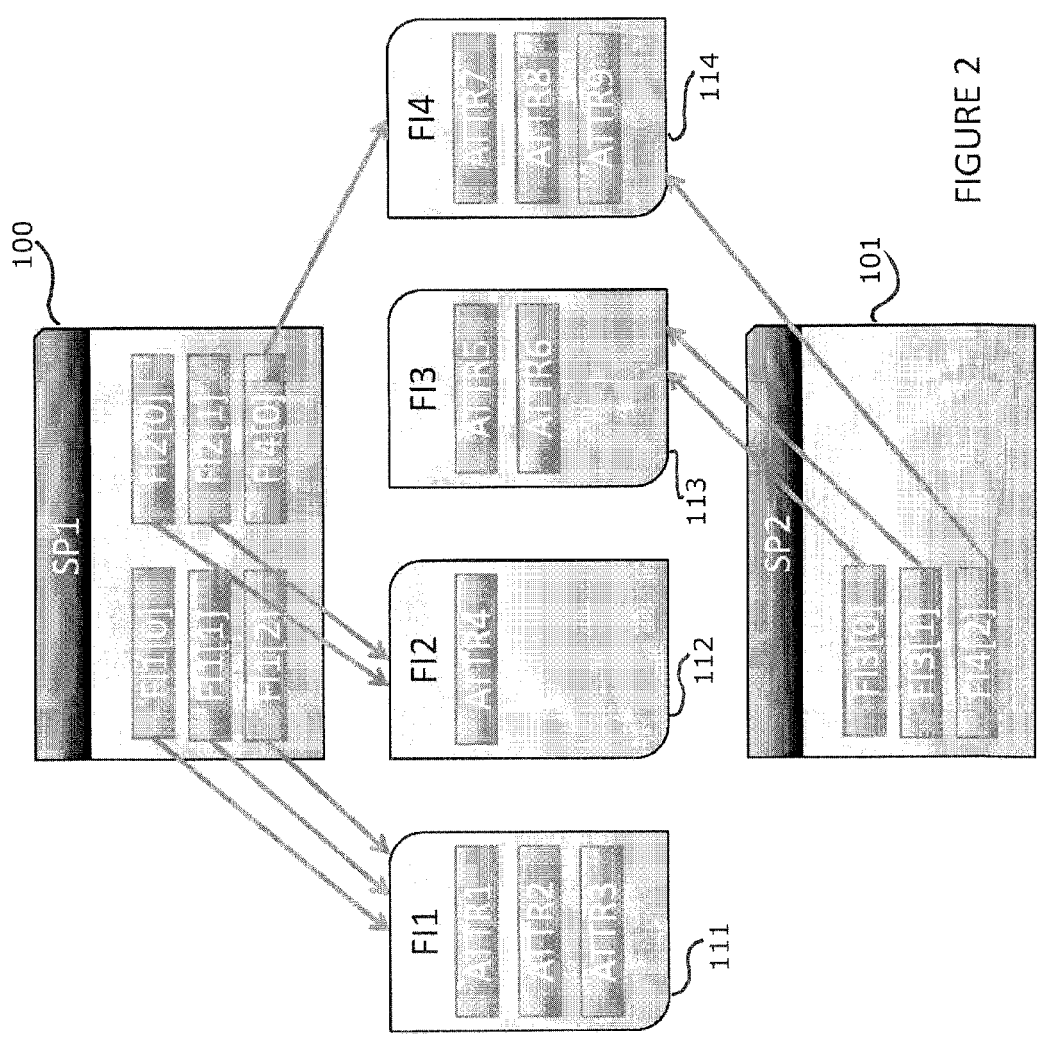
FIG. 2 shows the relationship between the specifications and functional interfaces.

FIG. 2 shows in more detail the relationship between specifications and functional interfaces. In this embodiment of the invention as illustrated, two specifications SP1 100 and SP2 101 are shown, although the invention can be applied to any number of specifications that may be held in the central repository 50.

Four different functional interfaces are also shown: FI1, FI2, FI3 and FI4, 111-114. As is clear from the figure, the functional interfaces are separate from, but are referred to by the specifications SP1 and SP2. The functional interfaces contain various different attributes. In this example, FI1 contains ATTR1, ATTR2 and ATTR3, FI2 contains ATTR4, FI3 contains ATTR5 and ATTR6 and FI4 contains ATTR7, ATTR8 and ATTR9. A functional interface may have any number of attributes, according to what the functional interface will be controlling. These attributes include, but are not limited to, the properties of the interface, methods steps that an interface can control, events that may be triggered by the interface and different types of data that may be present in the interface.

In FIG. 2 as illustrated, SP1 100 has three references to FI1; FI1[0], FI1[1] and FI1[2]; two references to FI2: FI2[0] and FI2[1]; no references to FI3 and 1 reference to FI4: FI4[0].

Similarly, SP2 contains two references to FI3: FI3[0] and FI3[1] and one reference to Fi4: FI4[2]. This specification does not contain any reference to F11 or F12.

The use of several instances of a single functional interface is illustrated with reference to example 3, where the advanced TV descriptor in column three has four functional interfaces for volume control: volume_control_capability[0], volume_control_capability[1], volume_control_capability[2], volume_control_capability[3].

Of course, a specification may be comprised of any number of functional interfaces (one or more) and each functional interface may be comprised of one or more attributes.

Figure 3:
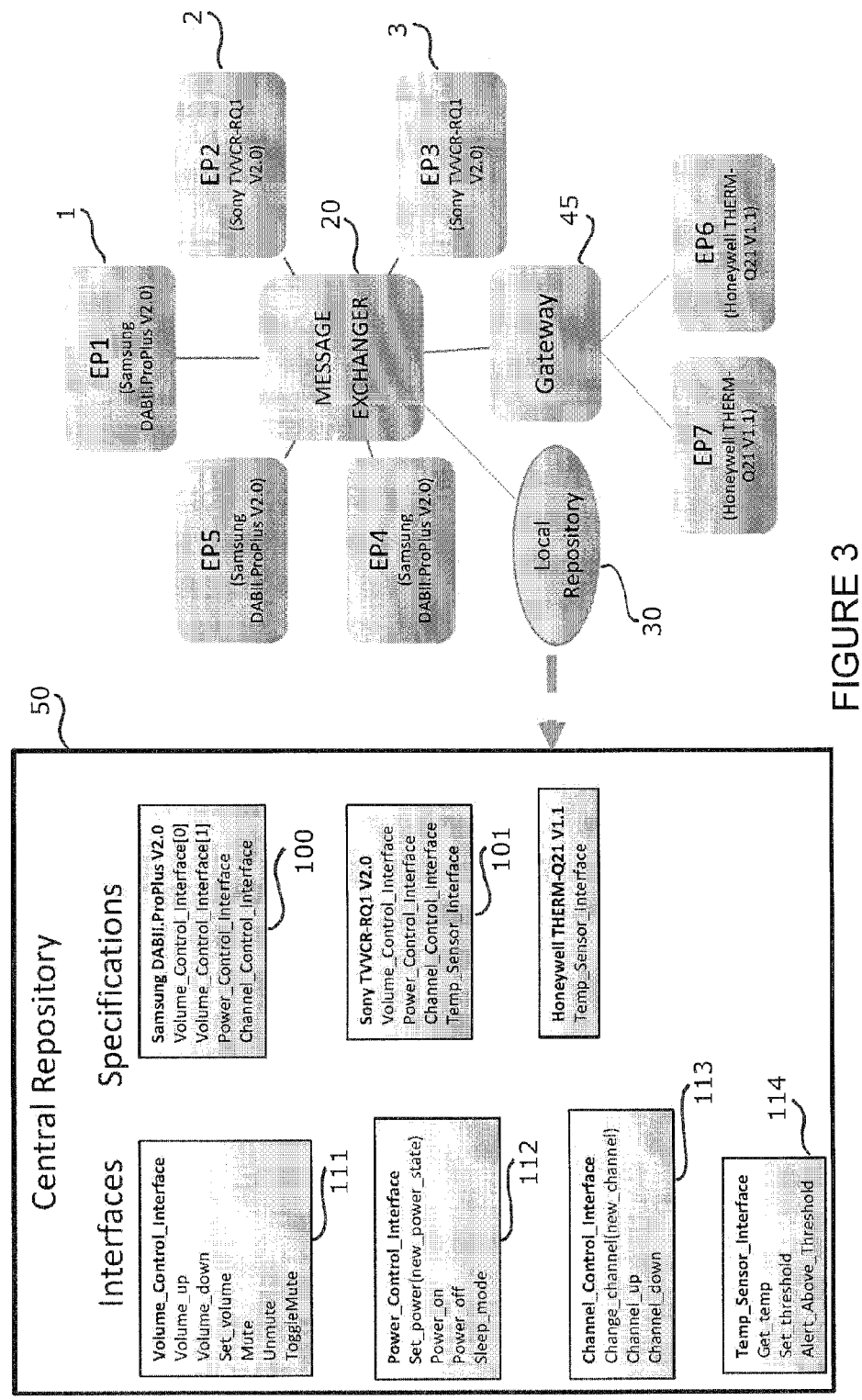
FIG. 3 shows a server managing multiple endpoints and communication with a central repository.
Figure 4:
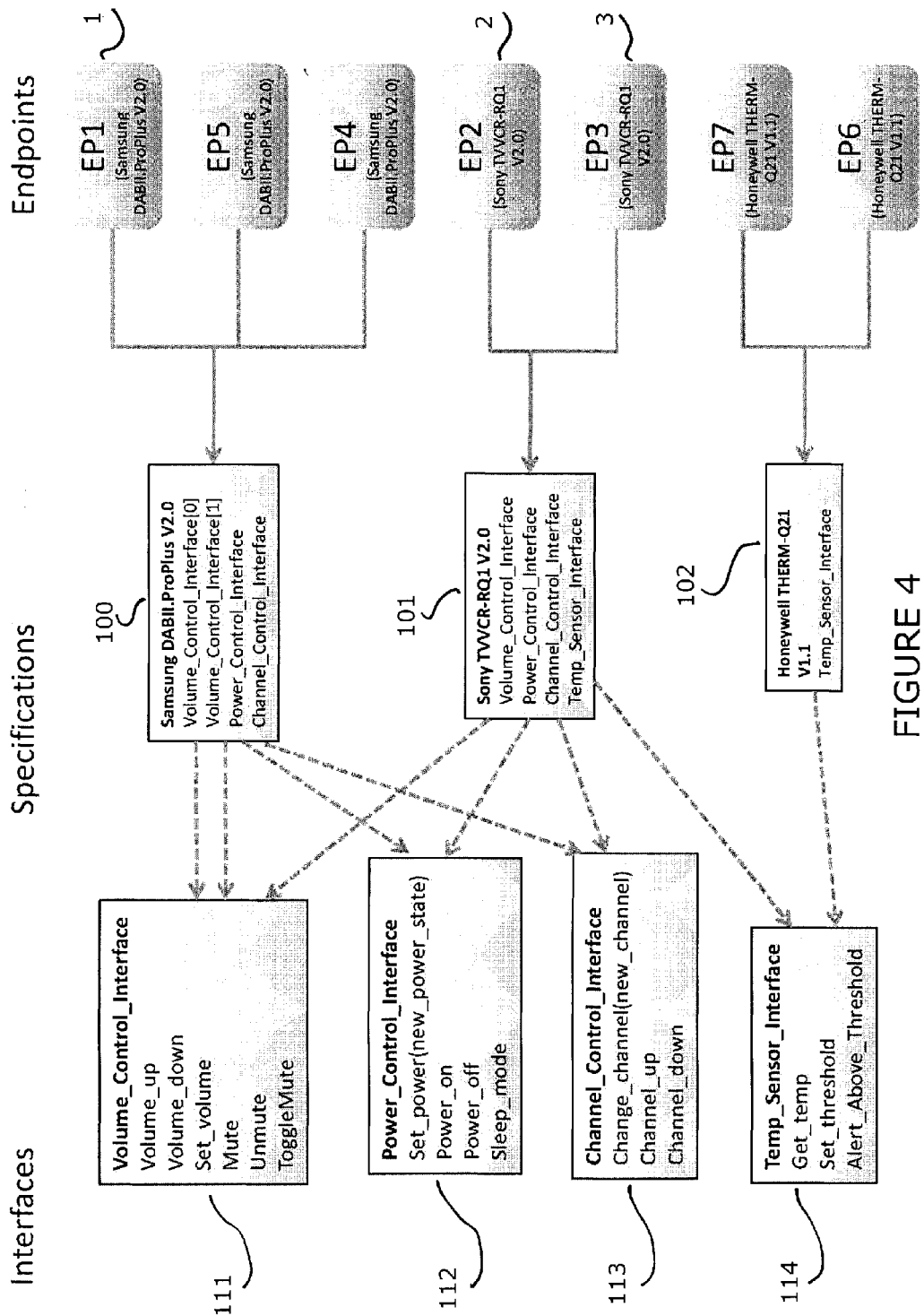
FIG. 4 is a more detailed view of the relationship between endpoints, specifications and interfaces.

FIGS. 3 and 4 show alternative views of the relationship between the functional interfaces 111, 112, . . . the specifications 100, 101 . . . , and the endpoints 1, 2, . . . n. Both of these figures show seven different endpoints EP1-EP7, three different specifications 100, 101 and 103, and five different functional interfaces 111, . . . 115. It is clear from the figures that EP1, EP4 and EP5 are the same type of device, in this case identified as Samsung DABII.PRopPlus V2.0 (a digital radio). Similarly EP2 and EP3 are the same type of device, identified as Sony TVVCR RQ1 V2.0 (a combined television and VCR player), and EP7 and EP6 are the same type of device, identified as Honeywell Therm Q23 V1.1 (a central heating controller).

Considering FIG. 3 initially, EP1-EP5 are connected directly to a message exchanger 20, whereas EP6 and EP7 are connected to a message exchanger 20 via a gateway 45.) and connects to central storage repository 50 via local repository 30. The central repository 50 has three specifications 100, 101 and 102, and five different functional interfaces 111-115.

Specification 100, which will be applied to EP1, EP4 and EP5 has Volume_Control_Interface[0]; Volume_Control_Interface[1]: Power_Control_Interface and Channel_Control_Interface.

Volume_Control_Interface[0] and Volume_Control_Interface[1] correspond to functional interface 111: Volume_Control_interface. Power_Control_Interface is functional interface 112 and Channel_Control_Interface is functional interface 113.

Specification 101 will be provided to endpoints EP3 and EP which are identified as Sony TVVCR-RQ1 V2.0. This specification has a Volume_Control_Interface corresponding to functional interface 111, a Power_Control_Interface corresponding to functional interface 112, a Channel_Control_Interface corresponding to functional interface 113 and a Temp_Sensor_Interface corresponding to functional interface 114.

Specification 102 will be provided to endpoints EP6 and EP7 which are identified as Honeywell THERM-Q21 V1.1. This specification only has a single functional interface, Temp_Sensor_Interface corresponding to functional interface 115.

Example specifications 100, 101, and 102 for endpoints EP1, EP3 and EP6 respectively are provided below:

Example Specification for Item 100

```
<specification description="An audio receiver and tuner."
name="Samsung Digital Audio Broadcast Tuner II - Pro
Plus." model="DABII.ProPlus" firmware="2.0" revision="1.0"
vendor="Samsung">
    <implements>
        <interface version="1.0"
        name="Volume_Control_Interface" index="0"/>
        <interface version="1.0"
        name="Volume_Control_Interface" index="1"/>
        <interface version="1.3"
        name="Power_Control_Interface" index="0"/>
        <interface version="1.0"
        name="Channel_Control_Interface" index="0"/>
    </implements>
</specification>
```

Example Specification for Item 101

```
<specification description="A TV and VCR combo, with built-in
temperature sensor." name="Sony TVVCR-RQ1 V2.0 Combo Unit"
model="TVVCR-RQ1" firmware="2.0" revision="1.0" vendor="Sony">
    <implements>
        <interface version="1.0"
        name="Volume_Control_Interface" index="0"/>
        <interface version="1.3"
        name="Power_Control_Interface" index="0"/>
        <interface version="1.0"
        name="Channel_Control_Interface" index="0"/>
        <interface version="3.2"
        name="Temp_Sensor_Interface" index="0"/>
    </implements>
</specification>
```

Example Specification for Item 102

```
<specification description="A room thermostat." name="Honeywell
THERM-Q21-RT1" model="THERM-Q21" firmware="1.1"
revision="1.3" vendor="Honeywell">
    <implements>
        <interface version="3.2" name="Temp_Sensor_Interface"
        index="0"/>
    </implements>
</specification>
```

An example interface for volume control interface 11 is shown below:

Example Interface for Item 111

```
<interface version="1.0" description="A simple volume control interface"
name="Volume_Control_Interface">
    <properties>
        <property write="False" read="True" type="integer" name="Set_Volume"
        description="Sets the volume level to the given value"/>
    </properties>
    <methods>
        <method type="null" name="Volume_up" description="Increases the volume by 1"/>
        <method type="null" name="Volume_down" description="Reduces the volume by 1"/>
        <method type="null" name="Mute" description="Mutes all audio output"/>
        <method type="null" name="Unmute" description="Unmutes all audio output "/>
        <method type="null" name="ToggleMute" description="Flips between muted and
        unmuted for each call."/>
    </methods>
    <events>
        <event name="volume_change" description="Notification of a volume change
        event">
            <parameter type="integer" name="new_volume_level" description="The
            new volume level"/>
        </event>
    </events>
    <types/>
</interface>
```

An example interface for Power control interface 112 is shown below:

Example Interface for Item 112

```xml
<interface version="1.3" description="A simple power control interface" name="Power_Control_Interface">
    <properties>
        <property write="False" read="True" type="powerStateType" name="current_power_state" description="Gets the current power state"/>
    </properties>
    <methods>
        <method type="null" name="Power_on" description="Sets the power state to on"/>
        <method type="null" name="Power_off" description="Sets the power state to off"/>
        <method type="null" name="Sleep_mode" description="Puts the endpoint into sleep mode"/>
        <method type="null" name="Set_power" description="Sets the power to the given state">
            <parameter optional="False" type="powerStateType" name="new_power_state" description="The target power state to move to."/>
        </method>
    </methods>
    <events>
        <event name="power_state_change" description="Notification of a change in power state">
            <parameter type="powerStateType" name="old_power_state" description="The prior power state"/>
            <parameter type="powerStateType" name="new_power_state" description="The new power state"/>
        </event>
    </events>
    <types>
        <simpleType name="powerStateType">
          <restriction base="xs:string">
            <enumeration value="off"/>
            <enumeration value="energySave"/>
            <enumeration value="standby"/>
            <enumeration value="on"/>
          </restriction>
        </simpleType>
    </types>
</interface>
```

An example interface for Channel control Interface 113 is shown below:

Example Interface for Item 113

```xml
<interface version="1.0" description="A simple TV tuner control interface" name="Channel_Control_Interface">
    <properties>
        <property write="False" read="True" type="integer" name="current_channel" description="Gets the current tuner channel"/>
    </properties>
    <methods>
        <method type="null" name="Channel_up" description="Moves to the next channel in ascending order"/>
        <method type="null" name="Channel_down" description="Moves to the prior channel in ascending order"/>
        <method type="null" name="Change_channel" description="Goes to the specified channel">
            <parameter optional="False" type="integer" name="new_channel" description="The number of the requested channel"/>
        </method>
    </methods>
    <events>
        <event name="channel_change" description="Notification of a change of channel">
            <parameter type="integer" name="new_channel" description="The new channel number"/>
        </event>
    </events>
    <types/>
</interface>
```

Finally, an example interface for Temp Sensor Interface 114 is also shown below:

Example Interface for Item 114 Temp Sensor

```
<interface vesion="3.2" description="A basic thermostat and temp controller" name="Temp_Sensor_Interface">
    <properties>
        <property write="False" read="True" type="double" name="current_temperature" description="Returns the current temperature in degrees celcius"/>
        <property write="False" read="True" type="double" name="current_threshold" description="Returns the current threshold in degrees celcies"/>
    </properties>
    <methods>
        <method type="double" name="Get_temp" description="Returns the current temperature in degrees celcius"/>
        <method type="null" name="Set_threshold" description="Sets a threshold temperature in degrees celcius. This is used as a trigger for Alert_Above_Threshold"/>
            <parameter optional="False" type="double" name="threshold_temp" description=""/>
        </method>
    </methods>
    <events>
        <event name="Alert_Above_Threshold" description="A notification that the temperature has increased above the alert threshold.">
            <parameter type="double" name="current_temperature" description="The current temperature"/>
        </event>
    </events>
    <types/>
</interface>
```

Of course, these are merely examples and other structures are possible for the specifications and interfaces of the present invention.

The invention also relates to a series of structured messages that can be sent across a variety of transports between different endpoints EPn within a management domain MD1, MD2. In all cases, the control messages do not pass directly between endpoints but are relayed via message exchanger 20. However, as mentioned previously, data or information which are not control messages can be transmitted directly between endpoints.

In the preferred embodiment of the invention XMPP is used as a communication channel, however, in alternative embodiments of the invention alternative transport protocols such as USB or HTTP for example may be used. In this system, the underlying operating system of the endpoints EP1 . . . EPn is irrelevant, as the messages can be transmitted efficiently across a multiplicity of different operating systems and transport protocols.

All messages transmitted and received between the endpoints EP1 . . . EPn and the message exchanger 20 described herein (with the exception of Notify messages) follow a Request/Response format, where the message is transmitted, between an endpoint EPn to a message exchanger 20, and a response is transmitted in the opposite direction back to either the endpoint EPn or the message exchanger 20 from which the original message originated.

Notify messages are transmitted between an endpoint EPn and a message exchanger 20 and do not require a response to be transmitted back in response, since the notify message is simply informational.

There are a number of common rules in place for the messages between an endpoint EPn and a message exchanger 20 and these are described in more detail below.

Firstly, for any request or response message, the data provided in the message must conform to the Data Type specified in the targeted interface (one of the attributes, as shown in FIG. 2), described using Xml Schema.

In the preferred embodiment of the invention, data is being transported over the transport protocol in XML. Configured messages as used in the invention are structured in simple XML, and are encapsulated in an addressing envelope of the transport protocol being used.

In a preferred embodiment of the invention, XMPP is the transport protocol that is used. However it is possible that other transport protocols may be used in alternative embodiments of the invention.

The main part of a message sent between and endpoint EPn and a message exchanger 20 is a Header. The header of the message includes specific addressing information. Within the message, there is also an Action element, which may additionally contain parameter elements.

The intent of a message sent between and endpoint EPn and a message exchanger 20 is to either:

1) inform the message exchanger 20 or an endpoint EPn of an action that has taken place (The message will be referred to as a notify message.)

2) request an action to take place (The actions may be any of the following: get, set execute or subscribe), within the network.

From the point that the message leaves an endpoint EPn, the message exchanger 20 is responsible for processing the message, forwarding the message on to other endpoints if necessary and responding back to the originating endpoint EPn with the end status. These steps will occur for all messages except for notify messages which do not require a response from the message exchanger 20 back to the originating endpoint EPn.

The XMPP Transport envelope wraps a message header in an XMPP message envelope. Typically, an XMPP message stanza has several predefined fields (see http://xmpp.org/rfcs/rfc3920.html and http://xmpp.org/schemas/jabber-client.xsd).

The structure of a typical message within the communication protocol of the present invention is shown below:

```
<message to="srv@domain.local" from="ep1@domain.local" id="1"
type="normal">
</message>
```

Of course, other structures are possible for the transmitted message and the above is merely an example.

Table 1 below, describes the attributes of the various components of the message as used in the present invention.

TABLE 1

| Message Component | Component Attributes |
|---|---|
| To | The address of the next entity for the next hop of communications. E.g. if this is from the source entity, going to the target entity, the source entity's server would be the next hop. In the above example, the message is going to "srv@domain.local" |
| from | The address of the entity currently sending the message. In the above example, the message is from "ep1@domain.local" |
| id | A unique identifier for this request/response pair or notification message. This only needs to be unique between the local entity and the server it is corresponding with. In the above example the message id is "1" |
| type | This attribute should be set to the value "normal", as in the above example. |

The message Header as used in the invention is the main part of a message, and the header is present in all messages between endpoints EPn and message exchangers over any transport protocol. The primary purpose of the message header is to provide information about the originating source (message exchanger/endpoints) and target (endpoint/message exchanger), along with protocol information and routing/handling information.

The structure of a typical message header within the communication protocol of the invention is shown below:

```
<tf    type="get"    target="ep2@domain.local"
source="ep1@domain.local" timestamp="2012-11-28T15:31:23Z"
expires="2012-11-28T15:31:53Z"    ttl="8"
xmlns="http://schema.transfabric.com/protocol/v1.0">
</tf>
```

Table 2 below describes the attributes of the various components of the message header

TABLE 2

| Message component | Component Attributes |
|---|---|
| source | The originator of this request or notification In the example above, the source is "ep1@domain.local" |
| target | The final destination of this request. In the example above, the target address is "ep2@domain.local" |
| timestamp | The date and time in UTC format. In the example above the time stamp is "2012-11-28T15:31:23Z" |
| type | This attribute can be set to any of the following: get, set, result (?response?), error. In the above example the type is "get". If this attribute is not specified, get is inferred. |
| expires | All messages have an inherent lifetime, after which time, they should be responded to with either a positive response or an error message. In the example above the expire time stamp is "2012-11-28T13:31:53Z" |
| xmlns | This specifies the version of protocol being used |
| ttl | This attribute describes the number of hops this message may pass before it is dropped and a response provided. In the above example the ttl value is "8" |

The different types of message that may be sent between the Endpoints EP1 . . . EPn and the message exchanger 20 include, but are not limited to:

Property get message (request);
property get message (response);
property set message (request);
property set message (response);
execute message (request);
execute message (response);
subscribe request message;
subscribe response message;
notify message.

Each different type of message will now be described in more detail below.

1) Property Get Message (Request)

A property get message asks the message exchanger 20 to return the value of a property associated with an Endpoint EPn, as defined by the specification for the specific endpoint EPn. The following is an example of the structure of a Get request message for the invention, including the XMPP Transport Header and Header elements of the communication protocol.

```
<message to="srv@domain.local" from="ep1@domain.local" id="1">
    <tf type="get" target="ep2@domain.local"
    source="ep1@domain.local">
        <property name=" tf.generic.powerController.currenPowerState "/>
    </tf>
</message>
```

Table 3 below describes the attributes of the various components of the request message

TABLE 3

| Message component | Component attribute |
|---|---|
| [tf].type | The type attribute is set to get in the above example |
| property element name | To make a property get request, a single property element should be present within the Header. This attribute contains the fully qualified interface and property name. For example, if you were requesting the currentPowerState property from the tf.generic.powerController interface, this attribute would need to contain tf.generic.powerController.currentPowerState. |
| index | If there are more than one of these interfaces implemented by the target entity, the index attribute MAY be used to target a specific one by specifying the zero-based integer number of the target interface |

2) Property Get Message (Response)

The property get message may alternatively be a response message. The structure of a typical response message is shown below:

```
<message to="ep1@domain.local" from="srv@domain.local" id="1">
    <tf type="result" target="ep2@domain.local"
    source="ep1@domain.local">
        <property
name="tf.generic.powerController.currentPowerState">example_value
</property>
    </tf>
</message>
```

Table 4 below describes the attributes of the various components of the response message.

TABLE 4

| Message component | Component Attribute |
|---|---|
| [tf].type | The Header's type attribute is set to 'result |
| property element | A response to a property get includes a single property element within the Header. |
| name | This attribute contain the same information that was provided in the request |
| index | This attibute contains the same information that was provided in the request that this response is addressing. |
| [data] | The response value to this request is provided within the property tag as escaped data |

3) Property Set Message (Request)

A property set message asks the message exchanger to set the value of a property associated with an endpoint EPn, as defined by the specification of the endpoint. The value of the property is set to the specific desired value.

The following is an example of the structure of a property set request, including the XMPP Transport Header.

```
<message to="srv@domain.local" from="ep1@domain.local" id="1">
    <tf type="set" target="ep2@domain.local"
    source="ep1@domain.local">
        <property name="tf.generic.powerController.currentPowerState ">example_value</property>
    </tf>
</message>
```

Table 5 below describes the attributes of the various components of the set request message.

TABLE 5

| Message component | Component Attribute |
|---|---|
| [tf].type | Header type attribute is set to 'set'. |
| property element | To make a property set request, a single property element should be present within the Header. |
| name | This attribute contains the fully qualified interface and property name. For example, if you were requesting the currentPowerState property from the tf.generic.powerController interface, this attribute would need to contain tf.generic.powerController.currentPowerState. |
| index | If there are more than one of these interfaces implemented by the target entity, the index attribute may be used to target a specific one by specifying the zero-based integer number of the target interface addressed. |
| [data] | The request contains the value that you want the property to be set to. |

4) Property Set Message

After a message exchanger 20 or endpoint EPn has received a property set message, it will respond back to the originating message exchanger 20 or endpoint with a property response message.

The following is an example of a property response message including an XMPP transport header and other header elements.

```
<message to="ep1@domain.local" from="srv@domain.local" id="1">
    <tf type="result" target="ep2@domain.local"
    source="ep1@domain.local">
        <property name="tf.generic.powerController.currentPowerState ">example_value</property>
    </tf>
</message>
```

Table 6 below describes the attributes of the various components of the set response message.

TABLE 6

| Message component | Component Attribute |
|---|---|
| [tf].type | The Header's type attribute should be set to 'result'. |
| property element | A response to a property set should include a single property element within the Header |
| name | This attribute should contain the same information that was provided in the request. |
| index | If there are more than one of these interfaces implemented by the target entity, the index attribute MAY be used to target a specific one by specifying the zero-based integer number of the target interface. |
| [data] | The response should contain the value that was specified in the set request. |

5) Execute Message (Request)

Another type of message used is an execute message. This type of message asks the message exchanger 20 to call a specific method with supplied parameters (if any) on a target endpoint EPn. This may or may not return a result, depending on the definition of the method. An example of the structure of an execute message is outlined below.

```
<message to="srv@domain.local" from="ep1@domain.local" id="1">
    <tf target="ep2@domain.local" source="ep1@domain.local">
        <execute name="tf.generic.powerController.changePowerState">
            <parameter name="example_parameter_1">
            example_value_1</parameter>
            <parameter name="example_parameter_2">
            example_value_2</parameter>
        </execute>
    </tf>
</message>
```

Table 7 below describes the attributes of the various components of the request execute message.

TABLE 7

| Message component | Component Attributes |
|---|---|
| [tf].type | The type attribute should be set to 'set'. |
| execute element | An execute request should include a single 'execute' element within the Header |
| name | This attribute contains the fully qualified interface and method name. For example, if you were requesting that the changePowerState method from the tf.generic.powerController interface, this attribute would need to contain tf.generic.powerController.changePowerState. |
| index | If there are more than one of these interfaces implemented by the target entity, the index attribute MAY be used to target a specific one by specifying the zero-based integer number of the target interface. |
| parameter element | The execute element contains zero or more parameter elements. These parameter elements match one of the available parameters for the specified method described in the interface you are targeting. |

Table 8 below shows the attributes of the request parameter elements as described in table 7 above.

TABLE 8

| | |
|---|---|
| Name | The name of the parameter you are providing. This will match one of the parameters described in the interface you are targeting. |
| [data] | The request contains the value that you want the property to be set to as escaped data within the property element. |

6) Execute Response Message

After the message exchanger 20/endpoint EPn has received and executed a request message it will respond to the originating message exchanger 20/endpoint EPn with an execute response message. An example of an execute response message is illustrated below:

```
<message to="ep1@domain.local" from="srv@domain.local" id="1">
    <tf type="result" target="ep2@domain.local"
    source="ep1@domain.local">
        <execute name="example_method">
            <parameter name="example_parameter_1">
            example_value_1</parameter>
        </execute>
    </tf>
</message>
```

7) Subscribe Request Message

Another type of message that may be used is a subscribe message. This type of message asks the message exchange 20 to watch the endpoint EPn for the specified event, and then to notify the subscriber when the event occurs.

The structure of a typical typical subscribe request message is shown below:

```
<message to="srv@domain.local" from="ep1@domain.local" id="1">
    <tf target="ep2@domain.local" source="ep1@domain.local">
        <subscribe name="example_event" subscribe="true"/>
    </tf>
</message>
```

8) Subscribe Response Message

The subscribe message outlined above may receive a subscribe response message in return. The typical structure of the subscribe response is outlined below.

```
<message to="ep1@domain.local" from="srv@domain.local" id="1">
    <tf type="result" target="ep2@domain.local"
    source="ep1@domain.local">
        <subscribe name="example_event" subscribe="true"/>
    </tf>
</message>
```

9) Notify Message

Another type of message that may be used in the communication protocol of the present invention is a notify message. A message of this type informs a user that an event has taken place.

An example of a notify message is shown below:

```
<message to="srv@domain.local" from="ep1@domain.local" id="1">
    <tf type="get" target="ep2@domain.local"
    source="ep1@domain.local">
        <notify name="example_event">
            <parameter name="example_parameter_1">example_value</parameter>
            <parameter name="example_parameter_2">example_value</parameter>
        </notify>
    </tf>
</message>
```

Each of these message types is transmitted as necessary between the endpoints EP1-EPn and message exchanger 20.

Although all of the examples provided in the specification are targeted to the consumer market, it should be understood that this solution can be applied to a wide range of area, including but not limited to: building management, remote telemetry, hospital systems, SCADA like systems and any other type of control and management of devices and/or applications etc. . . .

It should be understood that the compositions and methods are described in terms of "comprising," "containing," or "including" various components or steps, the compositions and methods can also "consist essentially of" or "consist of" the various components and steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recite. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A method of enabling communication between devices and/or applications and/or a server within a network, the members of the network comprising at least one device and/or application, at least one server, and a central storage repository and/or a local storage repository; the method comprising the steps of:
   providing a specification for each device and/or application and/or the at least one server to said central storage repository or said local storage repository; wherein the specification is comprised of one or more functional interfaces, each interface defining one or more attributes or operating characteristics of the device or application or server,
   providing one or more functional interfaces, or one or more specifications for one or more devices and/or applications from either said central repository or said local repository to one or more other devices and/or/applications within the network to allow either:
      communication between said first device/application and said one or more other device/application server or
      to allow said other devices and/or applications to operate in accordance with said functional interfaces or one or more specifications as provided from said central storage repository or said local repository.

2. The method according of claim 1 wherein when new devices and/or applications and/or servers join said network and have defined specifications, the specifications for the new devices and/or applications and/or servers are provided to said central repository and/or said local repository to be easily accessible to other members of the network.

3. The method of claim 1 wherein, when new devices and/or applications and/or servers join said network, and have compatible defined specification, said specification has been pre-provided to said central or local storage repository by the manufacturer.

4. The method of claim 1 when new devices and/or applications and/or servers join said network and do not have a compatible defined specification, a compatible specification can be created from specifications within said central repository according to the desired functionality of the new devices and/or applications and/or servers.

5. The method of claim 2 wherein when a said device and/or application is upgraded by the manufacturer the manufacturer provides an upgraded specification to said storage repository.

6. The method of claim 5 wherein said upgraded specification will contain a reference to the specification it is an upgrade of.

7. The method of claim 1 wherein the one or more specifications are all provided to said central storage repository in the same language.

8. The method of claim 7 wherein said language is XML.

9. The method of claim 1 wherein at least one of said one or more specifications is provided with a unique identifier code.

10. The method of claim 1 wherein said central storage repository is provided with a library so that specifications with a particular functional interface are stored in a specific region of said library.

11. The method of claim 1 wherein the device is any physical device that is internet enabled.

12. The method of claim 1 wherein said application performs as a virtual device.

13. The method of claim 12 wherein said virtual device is provided with a specification from said repository comprising at least one functional interface to allow it to operate in the same way as a physical device.

14. The method of claim 1 wherein said specification contains a cross reference to one or more of the other specifications.

15. The method of claim 1 further comprising the step of: transmitting at least one message between members of the network.

16. The method of claim 15 wherein a first message is transmitted from a device or application to a server.

17. The method of claim 15 further comprising the steps of reviewing said first received message at said server, and either
   transmitting said received message unchanged from said server to an alternative device or application from that where the message originated, or
   generating a revised message in response to said received message and transmitting the revised message to a device or application within the network.

18. The method of claim 17 wherein said revised message is transmitted to a different device or application to the device or application where the original received message originated.

19. The method of claim 15 wherein said at least one message provides status information about the device/application it originated from or is a request for action or for information from the server or from another device or application.

20. The method of claim 19 wherein said message is a request for action; and when said message is received from said server at said device or application, said device or application implements the action requested in the message.

21. The method of claim 15 wherein said devices and/or applications can receive and/or transmit more than one message, to execute more than one different action.

22. The method of claim 15 wherein said messages are transmitted over an XMPP transport layer protocol.

23. The method of claim 22 wherein said messages are written as XML messages.

24. The method of claim 1 further comprising the step of allowing communication between devices or applications and the server, but forbidding direct communication between devices and/or applications, thereby ensuring the security of the network.

* * * * *